[54] PLUMBING FIXTURE OVERFLOW LIMITER

[75] Inventors: Earl L. Morris, Whittier; Walter V. Hafner, Industry; Theodore J. Sally, Whittier, all of Calif.

[73] Assignee: Acorn Engineering Co., Industry, Calif.

[21] Appl. No.: 38,449

[22] Filed: May 14, 1979

[51] Int. Cl.² .................... E03D 11/02; E03D 11/18
[52] U.S. Cl. .......................................... 4/427; 4/302; 4/DIG. 3; 4/DIG. 15; 4/249; 4/406; 137/392; 137/624.12
[58] Field of Search ..................... 4/427, 302, DIG. 3, 4/DIG. 15, 1, 249, 313, 304, 305, 301, 308, 406, 404, 407, 325, 317, 312, 172.17; 137/606, 392, 624.12; 251/131

[56] References Cited

U.S. PATENT DOCUMENTS

| | | | |
|---|---|---|---|
| 2,707,482 | 5/1955 | Carter | 4/DIG. 3 |
| 2,858,546 | 11/1958 | Tekenos et al. | 4/313 |
| 2,988,751 | 6/1961 | Rutherford | 4/427 |
| 3,121,880 | 2/1964 | Gelhar | 4/249 |
| 3,713,177 | 1/1973 | Tufts et al. | 4/320 |
| 3,751,736 | 8/1973 | Egli | 4/305 |
| 3,908,204 | 9/1975 | Hopkins | 4/406 |
| 3,928,874 | 12/1975 | Albertson | 4/1 |
| 3,987,502 | 10/1976 | Hartman | 4/427 |
| 4,041,557 | 8/1977 | Ringler | 4/427 |

Primary Examiner—Henry K. Artis
Attorney, Agent, or Firm—Ben E. Lofstedt

[57] ABSTRACT

A plumbing fixture with a toilet bowl having a P-trap with means for inhibiting overflow from the toilet bowl when an obstruction exists in the waste outlet thereof, comprising: a tolet bowl having a flushing rim thereabout adapted to be coupled to a water supply pipe; an electrically controlled flushing valve for controlling the flow of water in the water supply pipe; a source of electricity for operating the flushing valve; a switch for controlling the flow of electricity to the flushing valve; a blow-out jet pipe coupled to the P-trap and adapted to be coupled to the water supply pipe; a hollow adapter having at least four openings thereinto wherein one opening is coupled to a water supply pipe, one opening is coupled to the blow-out jet pipe, and one opening is coupled to the flushing rim so that when water resides therein water also resides in the adapter via the opening coupled to the flushing rim, said adapter having a weir therein dividing the openings coupled to the water supply pipe and the blow-out jet pipe from the other openings therein; and an electrical probe mounted in the remaining opening in the adapter thereby disposing it below the top of said weir, the electrical probe being operably connected to a detection circuit, the detection circuit operating to prevent the electrical actuation of the flushing valve when water is in the flushing rim and in the adapter about the probe, and completes the circuit between the probe and electrical ground.

10 Claims, 6 Drawing Figures

U.S. Patent  Apr. 1, 1980  Sheet 1 of 2  4,195,374
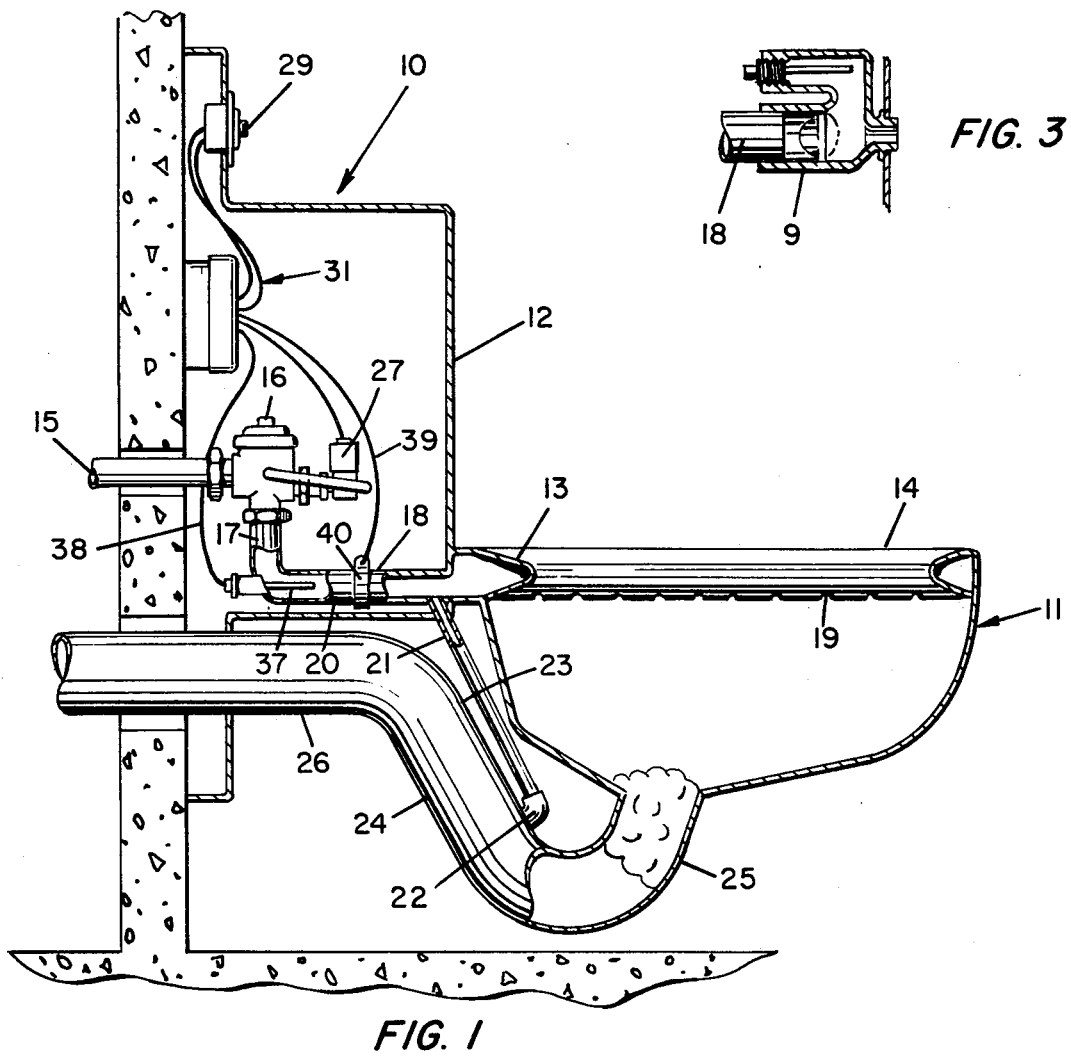
FIG. 1
FIG. 3
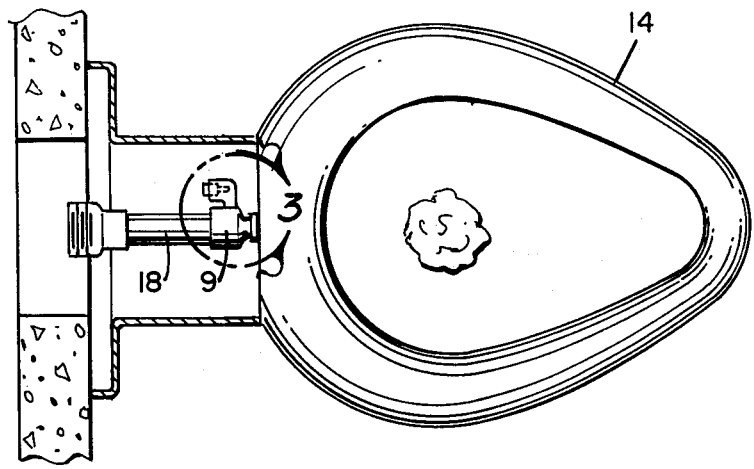
FIG. 2

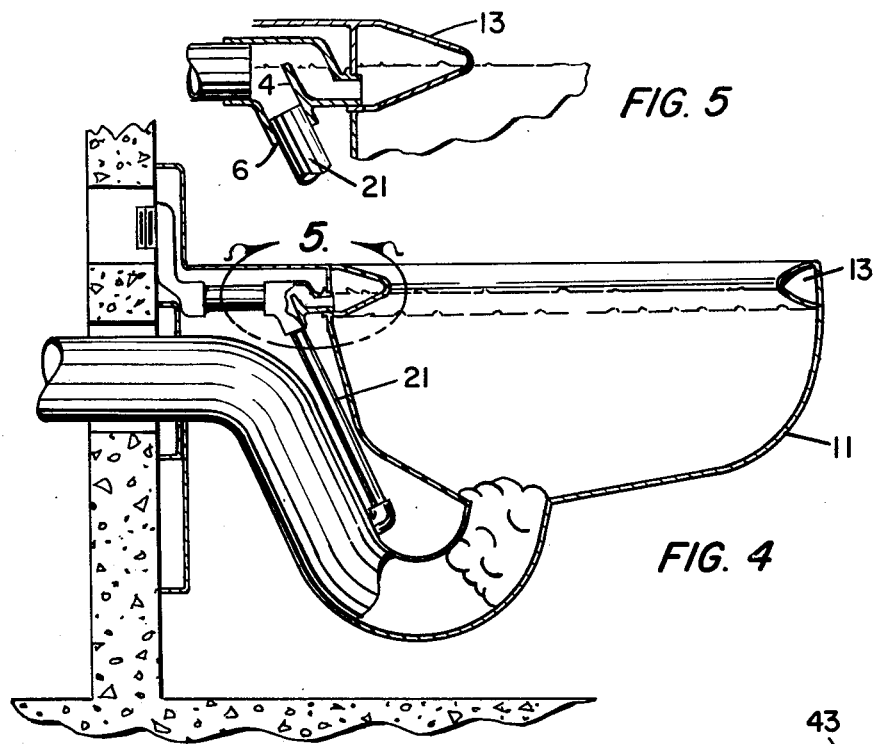
FIG. 5
FIG. 4
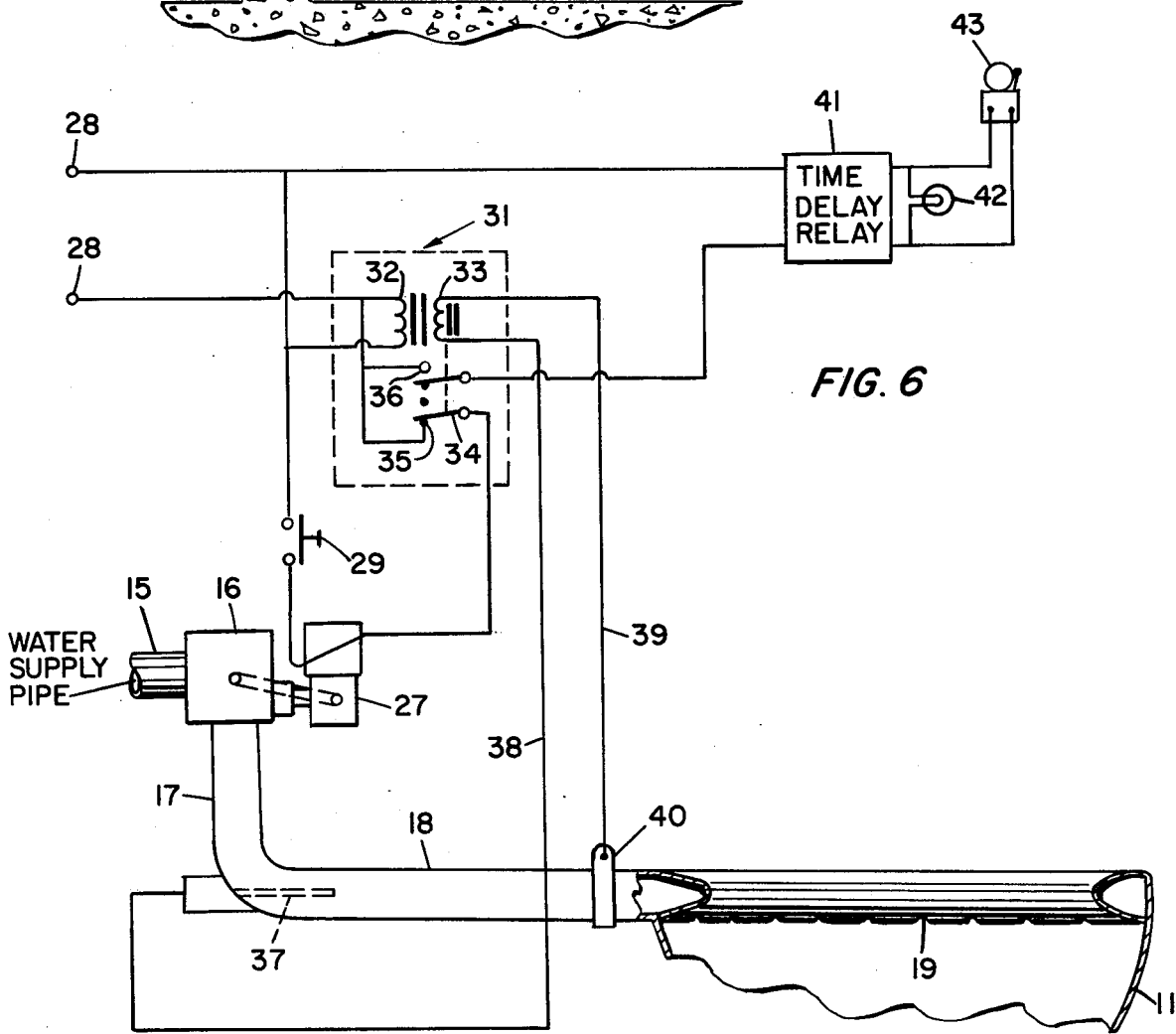
FIG. 6

PLUMBING FIXTURE OVERFLOW LIMITER

BACKGROUND OF THE INVENTION

1. Field of the Invention

The present invention relates to plumbing fixtures for penal institutions, and the like, and, more particularly, to plumbing fixtures incorporating means for preventing overflow from the toilet bowl, flooding and subsequent damages caused typically by an obstruction of the waste outlet of the toilet bowl.

2. Description of the Prior Art

Penal institutions, and the like, provide cells for the inmates thereof, such cells typically being equipped with a single, combination plumbing fixture which includes a lavatory and a toilet bowl or water closet. Preferably, such a combination unit is wall-mounted to allow the unit to be securely anchored to the wall to prevent removal thereof from the side of the plumbing fixture which is exposed to the cell area and the inmate thereof. Additionally, a wall-mounted unit usually permits servicing and maintenance of the unit, when necessary, from the opposite side of the wall not accessible from the cell area, thereby, eliminating the need for authorized serivce personnel to enter the cell area holding the inmates. Such an arrangement improves the basic overall security of the penal institution.

The lavatory usually consists of a fixed bowl or basin with a pushbutton-activated, time-delayed close faucet providing running water thereinto, with a drain pipe for draining of the water-based effluent therefrom following use by the inmate or inmates. The toilet bowl of the combination plumbing fixture consists typically of a water flushed bowl with a toilet seat which is utilized for inmate urination and defecation.

A major problem of providing such a plumbing fixture for inmate convenience is that inmates will attempt to cause damage to the institutional facilities by causing either, or both, of the lavatory or toilet bowl, to overflow their rims thereof and to flood the institutional facilities. This is frequently accomplished by obstructing the waste outlet of the toilet bowl or drain pipe of the lavatory, or both, by stuffing clothes, or other ojects, into the waste outlet or drain pipe, and adjusting the water flow control valves for continuous flow, or repeatedly flushing, as the case might be; the object being to admit into the basin or toilet bowl a greater volume of water than can be drained out of the wate outlet or drain pipe. The end result is a flooding condition in the cell area, and of the institutional facilities adjacently disposed thereto. This flooding can cause a substantial amount of property damage, especially, as is frequently the case, if the cells are located on an upper floor of a building housing offices, storage files, or other functional installations therebeneath.

The prior art abounds with numerous attempts to electrically control the fluid levels in toilet bowls and water closets. I am aware of the following prior art patent references which electrically and electronically control water closets and urinals: U.S. Pat. Nos:

| | | | | |
|---|---|---|---|---|
| 1,985,314 | 2,707,482 | 3,034,151 | 3,329,974 | 3,751,736 |
| 2,552,625 | 2,858,546 | 3,066,314 | 3,334,359 | 3,908,204 |
| 2,603,794 | 2,908,017 | 3,115,643 | 3,339,212 | 3,928,874 |
| 2,612,901 | 2,988,751 | 3,121,880 | 3,593,346 | 3,987,502 |
| 2,635,691 | 3,024,469 | 3,314,081 | 3,713,177 | 4,041,557 |

However, the following U.S. Pat. bearing Nos: 3,928,874; 3,987,502; and 4,041,557 have been examined and are believed to be of pertinent interest with respect to the invention presently disclosed herein.

U.S. Pat. No. 3,928,874 discloses a mechanism for preventing the overflow of flushing fluid from a toilet bowl when the fluid level in the toilet bowl reaches a pre-determined level; a fluid level which is determined to be abnormal or dangerously close to overflowing the rim of hte toilet bowl. Basically, this device comprises tow functional parts. First, an electric switch mounted in the toilet bowl which is activated by a flushing fluid level in the toilet bowl which has been previously determined to represent an abnormal or dangerous level, and, second, an electrically operated flushing fluid control valve operably coupled to the switch which is rendered inoperable when the switch is activated.

However, the relevant key to this device is the specific fluid level sensing system and its arrangement and location used to activate the electric switch. Such switches are generally identified by 28 in FIGS. 1-6, inclusive, of the Drawings. The switch configurations illustrated in FIGS. 1, 2 and 4 are undesirable for use because they can be rendered inoperative when clogged with solid waste, including toilet paper and fecal matter. Such clogging can easily occur when toilet paper, solid fecal matter, or both, come into contact with the float 30 of FIG. 2 and float 44 of FIG. 4, and stick thereto. Such sticking of either material adds to the weight of the floats 30 and 44, thereby changing their buoyancy characteristics and rendering them, at best, unpredicable or, at worst, inoperative to the point of permitting an overflow.

Further, the toilet paper, fecal matter, or both, could easily become wedged inbetween the wall of the toilet bowl 16 and the float 30, thereby, preventing the float 30 from being buoyed upwardly to activate the switch 28 to terminate the flow of flushing fluid into the toilet bowl 16 and preventing an overflow. The very samy thing could readily occur with respect to the float configuration 44 of FIG. 4 with the same results.

While the switch configuration disclosed in FIG. 5 eliminates these disadvantages and undesirable features, it, along with the switch configurations of FIGS. 1, 2 and 4, are readily subject to inmate vandalism which is usually rampant and unpredictable in penal institutions and the like. For example, the floats 30 and 44 could be easily jammed and rendered inoperative by an inmate deliberately wedging something inbetween the float and the wall of the toilet bowl 16. With respect to the pressure switch mechanism 48 of FIG. 5, the inmate could easily cut, tear, or rip the fabric of the diaphragm 56, thereby, rendering it inoperative and non-functional.

With respect to the arrangement disclosed in FIG. 6, while the placement of the pressure switch 48 renders it inaccessible to the inmate, it is undesirable due to the fact that should a blockage occur in the downwardly inclined or hooked portion 26 of the drain line 22 of the toilet bowl 16, the flushing system could be flushed to fill the toilet bowl 16 above the blockage and re-flushed to produce as many overflows as desired. Normally, the only time that flushing fluid is delivered into the upper portion 24 of the drain line 22 is during the flushing cycle; otherwise, no water or pressure head exists as implied by the inventor thereof in column 2, lines 50-56, inclusive. The same holds true for the pressure switch 60 arrangement illustrated in FIG. 7.

U.S. Pat. No. 3,987,502 teaches, in combination, a plumbing fixture 10 including a means for preventing overflow when an obstruction occurs in the waste pipe 34 of the water closet or toilet 16, including a water flushed bowl 30, or in the drain pipe 22 of the bowl or basin 18 of the lavatory 14. Such is accomplished by inserting an electric sensing probe 50 positionally below the rims of the basin 18 and bowl 30 via the walls thereof, and, are electrically insulated from the walls, so that when the flushing fluid, which is electrically conductive, contacts the sensing probes 50, the probes 50 are electrically shorted to the electrically-conductive walls of the basin 18 and bowl 30, thereby activating a normally open solenoid-controlled valve 26 or 38, as the case might be, each mounted in the water supply lines for the basin 18 and the bowl 30, turning off the supply of water to prevent overflow of either the basin 18 or the bowl 30.

FIGS. 3A and 3B clearly disclose the position of the sensing probe (mislabeled as 62) within the flushing rim 52 (referred to an an overflow chamber 54).

Such an arrangement is unacceptable for use in a penal institution because it can be easily rendered inoperable by an inmate by merely spraying an electrically insulating coating or paint or coating it with Vaseline petroleum jelly, or the like, through the outlet passageways disposed below the inwardly turned portion 80 of the rim 52, thereby preventing the probe 50 from being activated to prevent overflow. Consequently, because such a system can be easily rendered inoperable by an inmate, it is not vandalproof, and, hence, is unacceptable for use in a penal institution or like institutional environment.

Perhaps, U.S. Pat. No. 4,041,557 is related most nearly of all of the prior art known to the inventor. This patent discloses an electrical toilet flushing mechanism useful in prisons and similar institutions which the inventor declares: " . . . cannot be made to overflow by repeated flushing, even if the toilet is clogged." This patent employs an electrical sensing probe, identified as an insulated electrode 47, similar to probe 50 of the mechanism of U.S. Pat. No. 3,987,502. However, in this case, the insulated " . . . electrode 47 is located in the toilet bowl flushing fluid supply pipe 15 back from the rim of the toilet bowl so that it is impossible for an inmate to disconnect the electrode or to defeat the action in any way." (Column 2, lines 54-57, inclusive.).

While the device disclosed in U.S. Pat. No. 4,041,557 eliminates the vandal problem encounted with the mechanism of U.S. Pat. No. 3,987,502, overflow can occur under both anticipated and normal blockage and obstruction conditions of the waste drain line 23. For example, consider the following obstruction situation. An obstruction or blockage is created at the bottom of the toilet bowl 5; however, this obstruction does not block the entrance to the waste line 23, nor the outlet of the blow-out line 21. If any water is standing in the toilet bowl 5 at a level sufficient to contact the electrode 47, it is bailed out so that the level is beneath the electrode 47 so that the electrode 47 will permit the flushing valve 11 to be actuated. Thereafterwards, the flushing valve 11 is actuated and flushing water rushes into the toilet bowl 5 adding a substantial amount of additional water to that already in the toilet bowl 5, and producing an overflow condition.

Further, even assuming that the water is not bailed out by hand from the toilet bowl 5 so that the water level will not contact the electrode 47, the water, in any event, will inherently drain out the blow-out line 21 into the waste line 23, thereby always placing the electrode 47 above the water level, thereby rendering the electrode 47 ineffective, in the toilet bowl 5 regardless of whether the outlet of the toilet bowl 5 is blocked to prevent drainage of the water and effluent from the toilet bowl 5. Consequently, the location of the electrode 47, and the corresponding electrical system as presented by the patentee will not overcome this problem, and the toilet bowl 5 will overflow under the condition, a typical condition, indicated and described hereinabove.

SUMMARY OF THE INVENTION AND OBJECTS:

A plumbing fixture with a toilet bowl having a P-trap with means for inhibiting overflow from the toilet bowl when an obstruction exists in the waste outlet thereof, comprising: a toilet bowl having a flushing rim thereabout adapted to be coupled to a water supply pipe; an electrically controlled flushing valve for controlling the flow of water in the water supply pipe; a source of electricity for operating the flushing valve; a switch for controlling the flow of electricity to the flushing valve; a blow-out jet pipe coupled to the P-trap and adapted to be coupled to the water supply pipe; a hollow adapter having at least four openings thereinto wherein one opening is coupled to a water supply pipe, one opening is coupled to the blow-out jet pipe, and one opening is coupled to the flushing rim so that when water resides therein water also resides in the adapter via the opening coupled to the flushing rim, said adapter having a weir therein dividing the openings coupled to the water supply pipe and the blow-out jet pipe from the other openings therein; and an electrical probe mounted in the remaining opening in the adapter thereby disposing it below the the top of said weir, the electrical probe being operably connected to a detection circuit, the detection circuit operating to prevent the electrical actuation of the flushing valve when water is in the flushing rim and in the adapter about the probe, and completes the circuit between the probe and electrical ground.

Accordingly, it is a primary and important object of the instant invention to provide a plumbing fixture which will prevent inmate attempts to produce overflowing, and the subsequent damage occasioned thereby, to the penal institution.

Another important object of the present invention is to provide a plumbing fixture wherein all controls which control the overflow inhibiting function are disposed in such a fashion that such cannot be reached, defeated or damaged by an inmate from that portion of the plumbing fixture exposed to the cell area.

A still further and primary object of the invention is to provide an electrically controlled fluid flushing system for a toilet bowl wherein it cannot be repeatedly flushed if the water level reaches a dangerously high level in the toilet bowl, such as near, or at, the toilet bowl rim.

It is a primary and important object of the present invention to provide a plumbing fixture of the type herein described with an electrically powered, remote-indicating alarm system to indicate when a plumbing fixture has reached a possible overflow condition and to rapidly identify which plumbing fixture it is.

Another primary and important object of the invention is to provide an overflow protection system for a water jet assisted toilet waste drain flushing system which will continue to prevent overflowing even in the event that the waste drain is blocked between the entrance to the blow-out pipe located in the waste drain pipe and the entrance to the waste drain pipe located at the bottom of the toilet bowl.

These objects, features and advantages of the invention herein, together with other objects and advantages which will become subsequently apparent reside in the details of construction and operation as more fully hereinafter described and claimed, reference being had to the accompanying drawings forming a part hereof, wherein like numerals refer to like elements throughout, and in which:

BRIEF DESCRIPTION OF THE DRAWINGS

FIG. 1 is a side elevational view, partly in section, of a plumbing fixture having a toilet bowl, embodying the present invention.

FIG. 2 is top view, partially in section, of the present invention.

FIG. 3 is a top view of the enlarged portion of View A—A of FIG. 2.

FIG. 4 is a side elevational view, partially in section, taken along Plane B—B of FIG. 2.

FIG. 5 is a side elevational view of the enlarged portion of View C—C of FIG. 4.

FIG. 6 is an electrical circuit diagram of the toilet overflow inhibiting circuit, the toilet flushing switching system, including the time delay, and an overflow indicator.

DESCRIPTION OF THE PREFERRED EMBODIMENT

With continued reference now to the Drawings herein, and, with particular emphasis now on FIG. 1, there is shown the plumbing fixture 10 having an electrically-controlled flushing toilet bowl 11 mounted to the cabinet portion 12 thereof. The toilet bowl 11 comprises a flushing rim 13 with an integral seat 14 for humans thereon. The toilet bowl 11 is provided with a water supply 15 which is fluidly coupled to an electrically-controlled flushing valve 16. The flushing valve outlet 17 is fluidly coupled to the water flushing line 18, part of the water supply pipe system, which, in turn, delivers the water to the adapter 9. The hollow adapter 9 has at least four openings thereinto: 8,7,6 and 5. Opening 8 is coupled to the water flushing line 18 which receives the water from the water flushing line 18 when the electrically-controlled flushing valve 16 is actuated by an electrical actuator 27 via a switch 29, as more fully disclosed and described hereinafterwards. Opening 7 is coupled to the flushing rim 13 at the rear portion thereof. Opening 6 is coupled to the entrance 20 of the blow-out jet pipe 21. Another opening 5 of the adapter 9 resides in an elongated portion of the adapter 9 which is generally disposed laterally to the water flushing line 18. Internally, within the adapter 9, there is a dam or weir 4, which partially divides the openings 8, 6 from openings 7,5. The weir 4 is operably arranged so that the opening 5 is disposed below the top of the weir 4. Additionally, the opening 7 is disposed below the top of the weir 4. Consequently, when water resides in the flushing rim 13, since the opening 7 to the adapter 9 is coupled to the lower portion of the flushing rim 13, it will also reside, correspondingly so, in the openings 7,5 of the adapter 9, and against the weir 4.

An insulated electrical probe 37 is installed in the opening 5 of the adapter 9, thereby disposing it beneath the top of the weir 4. The electrical probe 37 is laterally disposed, in this particular embodiment, to the water flushing line 18 and is physically disposed therein so that if any water should be standing in the flushing rim 13 following the flushing sequence, the water will flow into the opening 5 of the adapter 9 via the opening 7 coupled to the flushing rim 13, thereby, immersing the electrical probe 37 in water.

It should be noted that the electrical probe 37 is also immersed in water during the flushing sequence.

Further, it is to be noted that the electrical probe 37, which is previously described and shown in the Drawings as insulated from the electrically conductive adapter 9 typically formed of metal, may be, alternatively, uninsulated and the adapter 9 formed of an electrically insulated material.

When the valve 16 is flushed, as described in detail hereinafterwards, the water is distributed, in relatively uniform fashion, about the flushing rim 13 and discharged therefrom into the toilet bowl 11 via the holes 19 distributed about the underside thereof.

The water flushing line 18 is fluidly coupled to the entrance of the blow-out jet pipe 21 via the adapter 9. Consequently, a portion of the flushing water is directed into the entrance 20 of the blow-out jet pipe 21. The blow-out jet pipe outlet 22 is fluidly coupled to the upper portion 23 of the P-trap 24 as it rises upwardly from its lower portion 25. Preferably, the blow-out jet pipe 21 is disposed between the P-trap 24 and the toilet bowl 11. In so doing, the length of the pipe needed for the blow-out jet pipe 21 is substantially reduced. Syphonic action is initiated by water flowing through the blow-out jet pipe 21 when a portion of the flushing water is passed therethrough. Effluent leaves the toilet bowl 11 through the waste line 26 coupled to the P-trap outlet.

In order to prevent standing water in the toilet bowl 11 from draining back through the flushing rim 13 into the flushing line 18 and into the blow-out jet pipe 21, via the adapter 9, and, thereafterwards, into the waste drain pipe 26 via the P-trap 24 before the electrical probe 37 becomes immersed in water in the event of an overflow, such as previously described with reference to U.S. Pat. No. 4,041,557, the openings 7,5, along with the electrical probe 37, is disposed below the top of the weir 4. A more complete understanding of the purpose and function of the wier 4 will be had as the description of the invention proceeds hereinafterwards.

As taught and disclosed by the present invention, an electrical actuator 27 is provided for valve 16 in lieu of the more conventional mechanically-actuated pushbutton initiated flush valve control.

With reference now also to FIG. 2, it is seen that electrical current is provided to the actuator 27 via the electrical lines 28 operably coupled to the source of electricity through the pushbutton switch 29.

Additionally, the electrical lines 28 are operably connected to the primary coil 32 of the induction relay, generally designated herein by 31. The induction relay 31 is an electrical device well-known in the prior art. It consists of a dual-coil electrical device, referred to commonly as a "transformer". Such a device has a primary coil 32 and a secondary coil 33 with a metal core relay armature 34. A pair of mechanically-coupled electrical contacts 35, 36 complete the relay 31. Electrical current will flow in the secondary coil 33 only when the secondary coil's circuit is completed as hereinafter described. When electrical current does flow through the secondary coil 33, the relay 31 is actuated by energizing the armature 34 of the secondary coil 33 because it develops a magnetic field which attracts the mechanical arms of the electrical contacts 35, 36.

The contacts 35 of the relay 31 are normally closed, while the contacts 36 are normally open. Contacts 35 are in series arrangement with one of the two electrical supply lines 28 connected to actuator 27. One side of the secondary coil 33 is electrically connected to the insulated electrical probe 37 located in the water supply line 18 by means of wire 38. The other secondary coil 33 wire is effectively coupled to electrical ground through wire 39. As shown, this is conveniently accomplished by connecting it to the outside of the pipe 18 by a clamp 40.

OPERATION OF THE OVERFLOW INHIBITING CIRCUIT

The flush valve 16 is actuated by pushing the pushbutton of switch 29. Since the contacts 35 are normally closed, current will flow through the actuator 27, thereby actuating the flush valve 16. Actuation of the valve 16 causes the flushing water to be delivered into pipe 18, the adapter 9, and into the rim 13 having a flushing chamber therein, through the holes 19 and into the toilet bowl 11. However, a portion of the flushing water which flows into the flushing line 18, will, as previously described, flow into the adapter 9 and the blow-out jet pipe 21 via the entrance 20 thereto. Additionally, the flushing water in the flushing rim 13 will flow in and about the electrical probe 37 in the adapter 9 which is fluidly coupled to the flushing rim 13 via opening 7. As is depicted herein, the adapter 9 is conveniently and preferably coupled to the rear portion of the flushing rim 13 and, in turn, couples the flushing line 18 to the flushing rim 13 of the toilet bowl 11. Since the opening 7 of the adapter 9 is disposed below the top of the weir 4 in the adapter 9, if there is any water in the rim 13, there will be water residing in the opening 7 of the adapter 9. Such a condition will exist if there is an overflow situation, or a near overflow situation. Of course, the electrical probe 37 is mounted in the opening 5 of the adapter 9 so that a portion thereof is also disposed below the top of the weir 4. Flushing water, being electrically conductive, causes the circuit to be completed between the electrical probe 37 and electrical ground, here, since it is typically metal, the plumbing fixture 10 via wire 39. Consequently, electrical current is caused to flow in the secondary coil 33, which electromagnetically pulls the contacts open. As long as the water remains in the opening 4, the contacts 35 remain open and it is impossible to again flush the toilet bowl 11 since the actuator 27 cannot be actuated.

OPERATION WHEN TOILET BOWL DRAIN IS OBSTRUCTED

As depicted in FIG. 1, an obstruction such as 2, such as might be caused by inmates stuffing clothing or the like into the toilet bowl 11 in an attempt to overflow the toilet bowl rim 13 by repeatedly flushing the toilet, will cause the water to engulf the electrical probe 37, thereby, preventing further actuation of the flushing valve 16.

It should be noted at this time that by coupling the entrance 20 of the blow-out jet 21 to the water flushing line 18, via the adapter 9, the water standing in the toilet bowl 11 cannot drain out through the line 18 and the blow-out jet pipe 21 because it will not flow over the elevated weir 4 which blocks water in order to ensure immersion of the probe 37. However, such will occur when the entrance 20 of the blow-out jet pipe 21 is coupled to the bottom portion of the line 18, as is the case, as previously discussed, in U.S. Pat. No. 4,041,557.

If the entrance 20 is coupled to the bottom portion of the line 18, which is the configuration disclosed in U.S. Pat. No. 4,041,557, the standing water will drain out below the electrical probe 37 and allow the flush valve 16 to be actuated again, even though the toilet bowl 11 is abnormally filled with water. Obviously, if flushed under such circumstances, water will overflow the toilet bowl 11 rim 13 and flood the institutional facilities.

MONITORING AND WARNING OF OVERFLOW CONDITION

Frequently, in an institutional environment, authorities are desirous of being alerted early of either the existence of flooding due to overflowing or of attemptings to create a flooded condition. To accomplish this task, the normally open contacts 36 of relay 31 are used by coupling a time-delay relay 41 in series arrangement with a line 28 of the source of electricity. Such can be used to turn a light 42 "on" or to sound an audible warning device 43, such as fixed frequency device, Mallory SONALERT ®, or a buzzer, or a bell.

Obviously, such items can be used as remotely located devices to signal an improper condition or activity orchestrated by the inmates of the institution. As an example, the light might be located in the office of one of the prison guards so that the proper authorities will be made instantly aware of the exact cell location of flooding or attempted flooding. The time delay relay 41 should be chosen with a time delay longer than the time required for line 18 to drain during a normal flush cycle.

It should be noted at this time, that security is assured by placing all of the electrical apparatus within the cabinet 12 of the plumbing fixture 10, thereby, precluding access thereto by unauthorized personel, such as the inmates.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention as claimed.

What is claimed is:

1. A plumbing fixture with a toilet bowl having a P-trap with means for inhibiting overflow from the toilet bowl when an obstruction exists in the waste outlet thereof, comprising:
   (a) a toilet bowl having a flushing rim thereabout adapted to be coupled to a water supply pipe;
   (b) an electrically controlled flushing valve for controlling the flow of water in the water supply pipe;
   (c) a source of electricity for operating the flushing valve;
   (d) a switch for controlling the flow of electricity to the flushing valve;
   (e) a blow-out jet pipe coupled to the P-trap and adapted to be coupled to the water supply pipe;
   (f) a hollow adapter having at least four openings thereinto wherein one opening is coupled to the water supply pipe, one opening is coupled to the blow-out jet pipe, and one opening is coupled to the flushing rim so that when water resides therein water also resides in the adapter via the opening coupled to the flushing rim, said adapter having a weir therein dividing the openings coupled to the water supply pipe and the blow-out jet pipe from the other openings therein; and (g) an electrical probe mounted in the remaining opening in the adapter thereby disposing it below the top of said weir, the electrical probe being operably connected to a detection circuit, the detection circuit operating to prevent the electrical actuation of the flushing valve when water is in the flushing rim and in the adapter about the probe, and completes the circuit between the probe and electrical ground.

2. The plumbing fixture of claim 1, wherein the toilet bowl having a flushing rim thereabout, includes a rim having a plurality of holes therebeneath for water to drain therefrom and a seat thereon for humans formed as an integral part of the rim.

3. The plumbing fixture of claim 1 wherein the electrical probe is disposed in lateral relationship to the water supply pipe.

4. The plumbing fixture of claim 1 wherein the opening to the adapter which is coupled to the flushing rim is smaller in diameter than the opening coupled to the water supply pipe.

5. The plumbing fixture of claim 4 wherein the opening to the adapter coupled to the flushing rim is disposed beneath the top of the weir.

6. The plumbing fixture of claim 1 wherein the opening to the adapter coupled to the blow-out jet pipe is disposed beneath the weir.

7. The plumbing fixture of claim 1 wherein the electrical probe is disposed above the opening of the adapter coupled to the blow-out jet pipe.

8. The plumbing fixture of claim 1 wherein the adapter is formed of an electrically insulated material.

9. The plumbing fixture of claim 8, wherein the electrical probe is non-insulated.

10. The plumbing fixture of claim 1 wherein the detection circuit means prevents electrical actuation of the flushing valve by disconnecting said source of electricity.

* * * * *